(12) United States Patent  
Wohlert et al.

(10) Patent No.: US 8,179,861 B2
(45) Date of Patent: May 15, 2012

(54) FEMTOCELL ORIGINATING DOMAIN SELECTION

(75) Inventors: Randolph Wohlert, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 340 days.

(21) Appl. No.: 12/550,651

(22) Filed: Aug. 31, 2009

(65) Prior Publication Data

US 2011/0053596 A1 Mar. 3, 2011

(51) Int. Cl.
*H04W 36/34* (2009.01)
(52) U.S. Cl. ......................................... 370/331; 455/444
(58) Field of Classification Search ................... 370/331, 370/338; 455/444
See application file for complete search history.

(56) References Cited

U.S. PATENT DOCUMENTS

| | | | |
|---|---|---|---|
| 2006/0121916 A1* | 6/2006 | Aborn et al. | 455/456.5 |
| 2007/0254620 A1* | 11/2007 | Lindqvist et al. | 455/403 |
| 2008/0064393 A1* | 3/2008 | Oommen et al. | 455/432.1 |
| 2008/0076423 A1* | 3/2008 | Lee et al. | 455/436 |
| 2008/0096560 A1* | 4/2008 | Felske et al. | 455/436 |
| 2008/0205386 A1* | 8/2008 | Purnadi et al. | 370/389 |
| 2011/0110300 A1* | 5/2011 | Sachs et al. | 370/328 |

OTHER PUBLICATIONS

U.S. Appl. No. 61/045,992, filed Apr. 18, 2008 (corresponds to Sachs et al. US 2011/0110300 A1).*

* cited by examiner

*Primary Examiner* — Melvin Marcelo

(57) ABSTRACT

A system and methodology that facilitates same-domain handovers between a femtocell and a surrounding macro cell is provided. In particular, the system can determine a domain of the surrounding macro cell and select a preferred domain for user equipment (UE) communication based in part on the determined domain. Moreover, a preferred domain selection component can be employed to determine the preferred domain based in part on various factors including a probability that a handover will occur, geographical location of femtocell and/or UE, motion of UE, communication history, user and/or service provider preferences and/or policies, service requirements, UE behavior patterns, etc. Further, the selected preferred domain can be utilized during communication with the UE, for example, while initiating voice calls.

20 Claims, 15 Drawing Sheets

FEMTOCELL ORIGINATING DOMAIN SELECTION

TECHNICAL FIELD

The subject disclosure relates to wireless communications and, more particularly, to facilitating efficient management of handovers between femtocells and macro cells.

BACKGROUND

Femtocells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice, sound, or data), ease of session or call initiation, and session or call retention as well. Offloading a RAN reduces operational and transport costs for the service provider since a lesser number of end users utilizes over-the-air radio resources (e.g., radio frequency channels), which are typically limited. With the rapid increase in utilization of global communications networks and/or devices such as the Internet, intranets, laptops, personal digital assistants (PDAs), etc., mobile data communications have been continually evolving due to increasing requirements of workforce mobility. Specifically, continuity of communication during handovers between femto and macro networks has gained significant importance.

When a mobile user travels between a femto and macro network, a handover is performed. For example, voice calls originated on a femtocell (e.g., in a home) can be transferred from the femtocell to a macro cell to provide the user with a continuous service experience while being mobile. Regardless of the foregoing advantages provided by femtocells, traditional operational designs of femto access points (APs) generally provide complex handovers when the signaling and bearer technologies in the femtocell and macro cells are different.

Typically, when different technologies (domains) are employed in the femtocell and macro cell, then the handover involves interworking between the different domains. Cross-domain interworking introduces additional call processing complexity, which requires additional resources and can reduce the quality of the user experience (e.g., service disruption, dropped calls). Additionally, cross-domain handovers may restrict the availability of services in different domains. Accordingly, such complex handovers can be time and/or resource consuming, cause delays during communication and result in degraded service quality. Real-time communication is delay sensitive and a delay during the handover can negatively impact performance and lead to user frustration.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate performing handovers between a femtocell and macro cell in a common domain. In one embodiment, a preferred domain selection component can be employed to determine a preferred domain that can be utilized during communication associated with a user equipment (UE). The preferred domain enables a same-domain handover between the femtocell and macro cell and thus avoids complex interworking during handovers between different domains. Further, a preferred domain utilization component can be employed that initiates communication associated with the UE by employing the preferred domain.

In accordance with another aspect, cross-domain handovers between a femtocell and a surrounding macro cell can be reduced when a UE moves between the femtocell and surrounding macro cell. Specifically, the system provides a component for identifying a preferred domain for communication associated with the UE, such that, the preferred domain facilitates a same-domain handover by the UE. In one aspect, the preferred domain can be determined based in part on a probability that a handover will occur, a domain of the macro cell, a geographical location of the femtocell, a geographical location of the UE, communication history, user preferences, service provider policies, service requirements, UE behavior patterns, and/or motion of the UE, to identify the preferred domain. Moreover, the system facilitates utilizing the preferred domain for initiating communication with the UE, such that, if a handover is preformed during the communication, the handover can be performed in the same domain.

Yet another aspect of the disclosed subject matter relates to a method that can be employed to determine a probability that a UE will move outside the femtocell's coverage area, when the UE is attached to the femtocell. Moreover, the method can include selecting a domain of the macro cell as the preferred domain when the probability is greater than a threshold and, selecting the macro cell or femtocell domain based in part on a service experience provided by each domain, when the probability is less than the threshold.

In another aspect, a method can be employed to determine a probability that the UE will move into the femtocell's coverage area, when the UE is within the macro network. Further, the method can include selecting a domain of the femtocell as the preferred domain when the probability is greater than a threshold and selecting the macro cell or femtocell domain as the preferred domain, based in part on the service experience provided by each domain, when the probability is less than the threshold.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
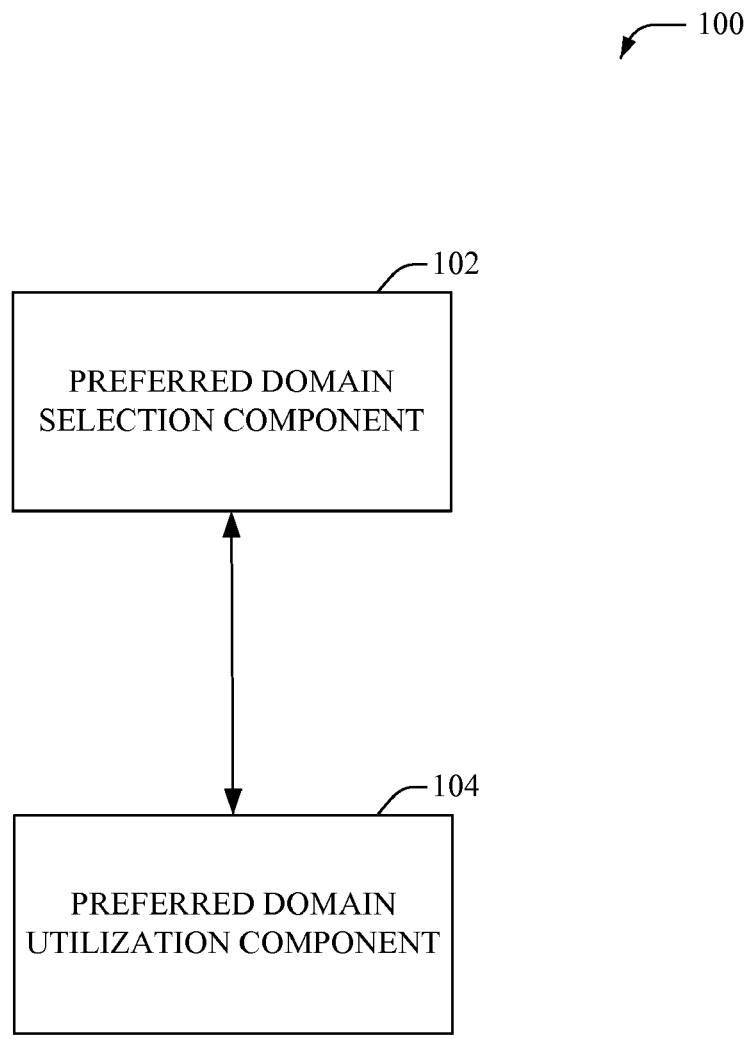
FIG. 1 illustrates an example system that facilitates utilization of a preferred domain during communication with a user equipment (UE).

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "femto cell access point", "femtocell" and "femto access point" are also utilized interchangeably.

Mobile devices often travel between macro cells and femtocells. While doing so, the user can be provided with a continuous service experience by performing a handover between the femto and macro cells. The signaling and bearer technologies in the femtocell and macro cells can be the same or different depending on the radio technologies involved, such as, but not limited to Universal Mobile Telecommunications System (UMTS), Global System for Mobile communications (GSM), and Long Term Evolution (LTE). Typically, when the signaling and bearer technologies are the same, the handover between the femtocell and the macro cell takes place within the same domain. However, when the signaling and/or bearer technologies are different, the handover involves interworking between the different domains. Conventional systems employ additional call processing complexity and extra resources to perform a cross-domain handover. Instead, systems and method disclosed herein facilitate selection of a preferred domain while receiving or originating communication at a user equipment (UE) and initiating communication in the selected domain. In one aspect, the preferred domain increases a probability of a same domain handover.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates utilization of a preferred domain during communication with a user equipment (UE), according to an aspect of the subject system. Typically, the system 100 can include a preferred domain selection component 102, which can be utilized to identify a preferred domain that can be employed for communication with UEs that subscribe to a wireless service provider. In one aspect, the preferred domain selection component 102 can calculate a preferred domain for each UE that is attached to a femtocell provisioned by the wireless service provider. Further, the preferred domain selection component 102 can calculate a preferred domain for each UE that is located within a specified distance and/or that is moving towards a femtocell provisioned by the wireless service provider. Additionally, the preferred domain selection component 102 can update the preferred domains associated with the UEs periodically or on demand.

The preferred domain selection component 102 can select a preferred domain in a manner such that utilization of the preferred domain reduces a probability of performing a cross-domain handover during communication. According to an aspect, the preferred domain selection component 102 can determine whether a handover is likely to take place. As an example, the preferred domain selection component 102 can determine a probability associated with a UE performing a handover between a femtocell and a macro cell. The probability can be computed based in part on various factors, such as, but not limited to, UE behavior, communication history, service provider policies, user preferences, etc.

In one aspect, the preferred domain selection component 102 can determine the geographical co-ordinates of a UE and a femtocell and calculate the distance of the UE from the femtocell, for example, by employing a Global Positioning System (GPS). Accordingly, the preferred domain selection component 102 can determine a high probability of handover when the UE is located in the macro cell at a very small distance from the femtocell coverage area. Further, the preferred domain selection component 102 can determine motion, speed and/or direction of travel associated with the UE. If the UE is travelling towards the femtocell, the preferred domain selection component 102 can associate a high probability for handover, whereas if the UE is travelling away from the femtocell, the preferred domain selection component 102 can associate a low probability for handover. Additionally, when a UE is attached to a femtocell, the preferred domain selection component 102 can associate a handover probability to the UE based in part on UE behavior patterns, historical data, service provider policies, user preferences, etc.

When the handover probability associated with the UE is greater than a threshold value, the preferred domain selection component 102 can select a preferred domain, for originating and/or receiving data at the UE, which can reduce complexity, increase the probability for smooth handoff, and ensure that the user's service set will be consistent when the handover occurs. The data can include, but is not limited to voice calls, content, or most any service. Further, it can be appreciated that the threshold value can be predefined, for example, by a service provider, or dynamically adjusted. In one aspect, the preferred domain can be selected based in part on information, such as, but not limited to, macro cell domain information, user preferences (e.g., charging considerations), service provider preferences and/or policies (e.g., traffic, congestion, network considerations), service requirements (e.g., QoS), and/or desired end user experience.

Further, when the handover probability associated with the UE is lower than the threshold value, the preferred domain selection component 102 can select a preferred domain, for originating and/or receiving data at the UE, which can provide the user with a better service experience. It can be appreciated that the preferred domain selection component 102 can be implemented within a macro core network, the femtocell, or the UE. Additionally or alternately, it can be appreciated that the functionality of the preferred domain selection component 102 can be distributed between the macro core network, the femtocell, and/or the UE.

System 100 can further include a preferred domain utilization component 104 that can employ the selected preferred domain for initiating communication with the UE. In one aspect, the preferred domain utilization component 104 can be implemented within the UE and can ensure that communication, such as, but not limited to, voice calls, originating from the UE can employ the preferred domain for communication. In another aspect, the preferred domain utilization component 104 can be implemented within the wireless network, for example, the macro network or the femtocell. The preferred domain utilization component 104 can enable utilization of the preferred domain for communication with the UE. For example, when a UE receives a voice call, the preferred domain utilization component 104 can employ the preferred domain to deliver the call to the UE.

Figure 2:
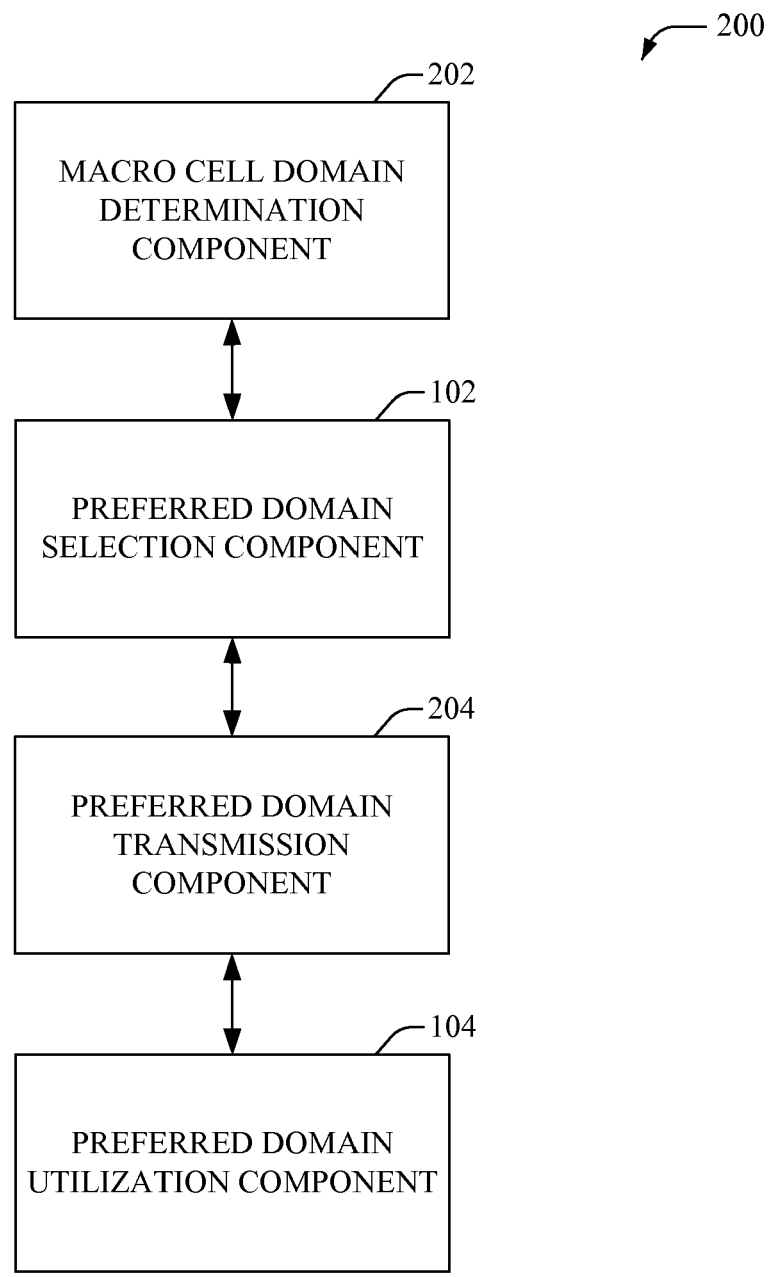
FIG. 2 illustrates an example system that can be employed to reduce the number of cross-domain handovers between femtocells and macro cells.

Referring to FIG. 2, there illustrated is an example system 200 that can be employed to reduce the number of cross-domain handovers between femtocells and macro cells, in accordance with an aspect of the innovation. In particular, system 200 initiates communication to/from the UE in a preferred domain, for example, that of the surrounding macro cell. In one example, system 200 can determine that a handover between the femtocell and macro cell is likely to occur, and accordingly initiate communication associated with the UE in a preferred domain that avoids a cross-domain handover. It can be appreciated that the preferred domain selection component 102 and the preferred domain utilization component 104 can include functionality, as more fully described herein, for example, with regard to system 100.

Further, system 200 can include a macro cell domain determination component 202 that identifies a domain employed by the macro cell. For example, the macro cell can employ a radio domain such as, but not limited to, Universal Mobile Telecommunications System (UMTS), Global System for Mobile communications (GSM), and Long Term Evolution (LTE). The macro cell domain determination component 202 can employ various techniques for the identification. In one aspect, the macro cell domain determination component 202 can employ provisioning data provided by a service provider to identify the macro cell domain. In another aspect, macro cell domain identification can be performed by the macro cell domain determination component 202 by radio signal detection, for example, by the femtocell and/or the UE. Additionally or alternately, communication history can also be utilized by the macro cell domain determination component 202 to determine the macro cell domain. It can be appreciated that a combination of the above aspects can be employed to perform macro cell domain determination.

As discussed supra, the preferred domain selection component 102 can determine a preferred domain associated with UE communication. According to an aspect, the preferred domain selection component 102 can analyze information identified by the macro cell domain determination component 202 to determine the preferred domain that can be employed during communication with a UE. Further, the preferred domain selection component 102 can also utilize user preferences (e.g., charging considerations), service provider policies (e.g., traffic, congestion, network considerations) and/or service requirements, to determine preferred domain. Typically, a preferred domain transmission component 204 can be employed to provide information associated with the preferred domain to the devices, such as but not limited to, UEs, femtocells, etc., involved in the communication, for example, prior to initiation of communication.

In one aspect, the preferred domain transmission component 204 can employ most any type of communication (e.g., wireless communication) to provide the information. As an example, the preferred domain information can be broadcast by the preferred domain transmission component 204, such that the UEs and/or femtocells utilize the preferred domain to initiate communication, for example, a voice call. Moreover, an additional parameter can be added (e.g., by the preferred domain transmission component 204) to a system information message on a broadcast channel, which can indicate the domain to be utilized for communication. According to an aspect, the preferred domain transmission component 204 can provide the preferred domain information to the UE during pre-configuration. For example, the preferred domain information can be provided before the UE is sold to a customer. Typically, a large number of femtocells can be deployed in a static environment and the data provided during pre-configuration can be valid until a major network upgrade occurs that can change the macro network (Circuit switched/Packet switched transport capability) around the femtocell.

Further, in an aspect, the preferred domain transmission component 204 can transmit the preferred domain via a signal to the UE when the UE attaches to the femtocell and/or via a signal to the UE by means of a special message from a network entity (e.g., a femto gateway) to the UE. As an example, the special message can include, but is not limited to a Short Message Service (SMS) message or an application layer message. It can be appreciated that a standard or proprietary application can be resident on the UE that can appropriately process the special message. Moreover, in the absence of Preferred Domain information (e.g., data error) a default domain could be used (e.g., circuit switched). Furthermore, a preferred domain utilization component 104 can receive the information provided by the preferred domain transmission component 204 and utilize the preferred domain during communication.

Figure 3:
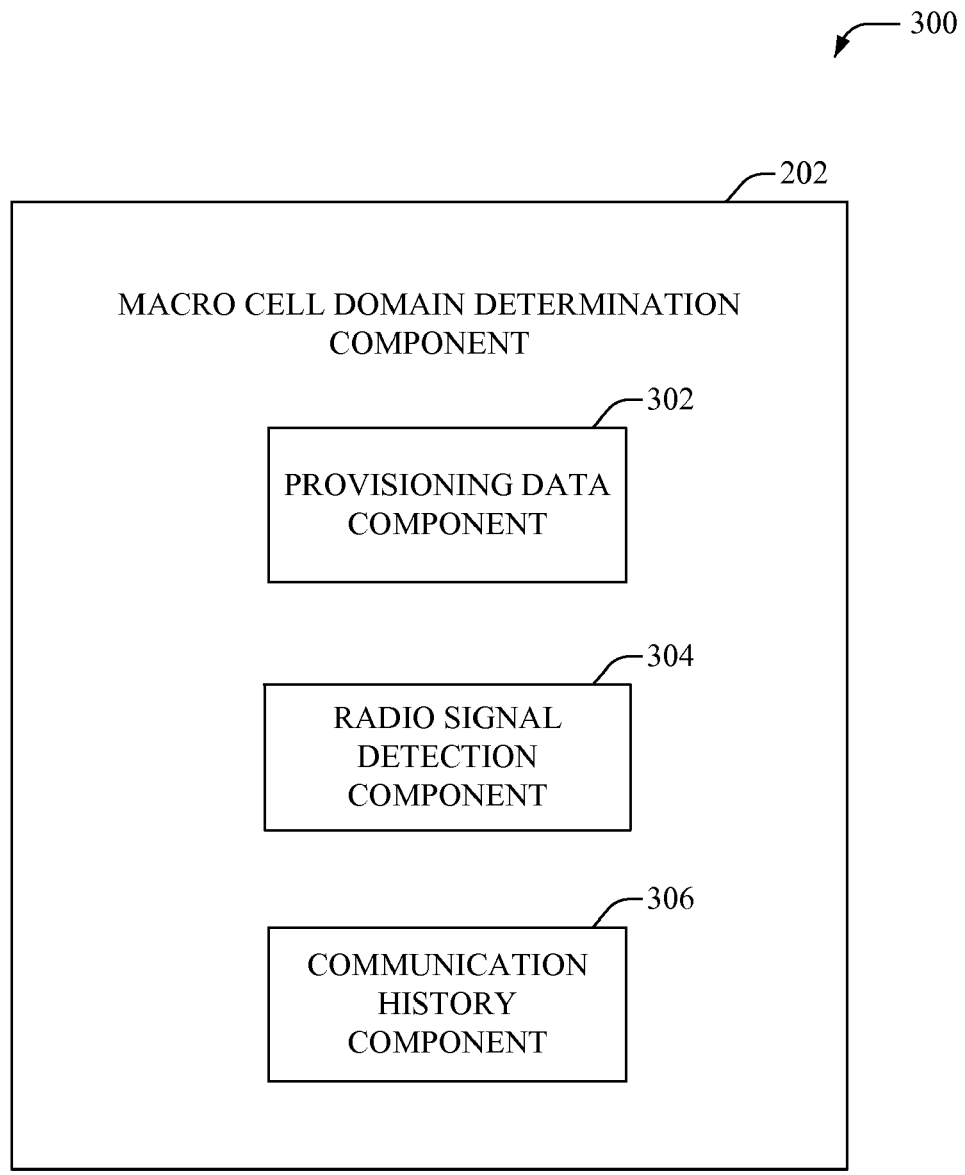
FIG. 3 illustrates an example block diagram of a component that determines a domain of a macro cell associated with a UE, according to the subject disclosure.

FIG. 3 illustrates an example block diagram 300 of a macro cell domain determination component 202. The macro cell domain information can be utilized to select a preferred domain for communication with a UE, such that cross-domain handovers between a femtocell and macro cell are minimized. It can be appreciated that the macro cell domain determination component 202 can include functionality, as more fully described herein, for example, with regard to system 200.

Typically, the macro cell domain determination component 202 can include a provisioning data component 302 that can receive and/or store information associated with a macro cell network's domain based on data, for example provided by a service provider during provisioning. The provisioning data component 302 can determine a location of the femtocell, for example, the femtocell can be installed within a home of a user. In one example, the provisioning data component 302 can utilize the user's home address to determine the location of the femtocell. Alternately, the provisioning data component 302 can employ data from a GPS system to receive the geographical location of the femtocell. Further, the provisioning data component 302 can determine the domain of adjacent or surrounding macro cells, for example, based on the service provider's network planning radio coverage tools and/or maps.

Further, a radio detection component 304 can be utilized to determine the domain of the macro cell associated with a UE. Specifically, the radio detection component 304 can perform a macro cell radio signal scan to determine the domain of the macro cell that surrounds a femtocell and/or a UE. In one aspect, the radio detection component 304 can be included within a femto access point (not shown). The radio detection component 304 can perform the macro cell radio signal scan when the femtocell is initially installed and/or periodically, for example, each day at a convenient time (e.g., 2 am), once per week and or at a time when the device (femto access point) is idle. Further, the macro cell radio signal scan can be initiated by the network, the UE attachment and/or the user. For example, the network can signal the femtocell to scan for macro cells, for example, when a network upgrade changes a macro cell deployment plan. In another example, the macro cell radio signal scan can be initiated by a UE attachment, such as, but limited to once per day when a UE attaches, or when the time elapsed since the femtocell was in utilized for communication exceeds a threshold (e.g., the femtocell has not been used in 48 hours and a UE attaches). In yet another example, the macro cell radio signal scan can be user initiated, for example, via a user interface on the femtocell, a web portal, and/or the UE.

In another aspect, the radio detection component 304 can be included within a UE. In this aspect, the radio detection component 304 can perform a macro cell radio signal scan, for example, for the cases of femtocell signal detection, such as but not limited to, when the femtocell is installed, when the UE comes into the proximity of the femtocell, or when the UE attaches to the femtocell. As an example, the macro cell radio signal scan can be initiated by the network, the UE, and/or the femtocell. Further, it can be appreciated that the macro cell radio signal scan can be performed at a scheduled time, on demand and/or periodically. In one example, the radio detection component 304 can utilize the geographic coordinates within the UE (e.g., provided by a GPS system) and trigger the macro cell radio signal scan when determined that the distance between the UE and the femtocell is below a threshold value. Further, the radio detection component 304 can also employ the speed, velocity, acceleration and/or direction of motion to trigger the macro cell radio signal scan. In another example, the radio detection component 304 can perform the macro cell radio signal scan when the UE detects the femtocell's radio signal. Additionally or alternately, a periodic scan can also be performed when determined that the UE is in close proximity to the femtocell, for example, by utilizing the geographic coordinates.

According to an embodiment, the macro cell domain determination component 202 can further include a communication history component 306 that can receive and/or store communication history associated with a UE. In particular, the communication history component 306 can determine and store a radio access technology type (e.g., Circuit Switched or Packet Switched) employed when communication, for example a call (originating or terminating) takes place with the UE. As an example, when the UE attaches to a femtocell, a 'last used' technology indicator can be provided to the preferred domain selection component (102 in FIG. 1) by the communication history component 306 for consideration as the preferred domain. Typically, the last used technology indicator can be stored in the UE and/or in the core network.

Figure 4:
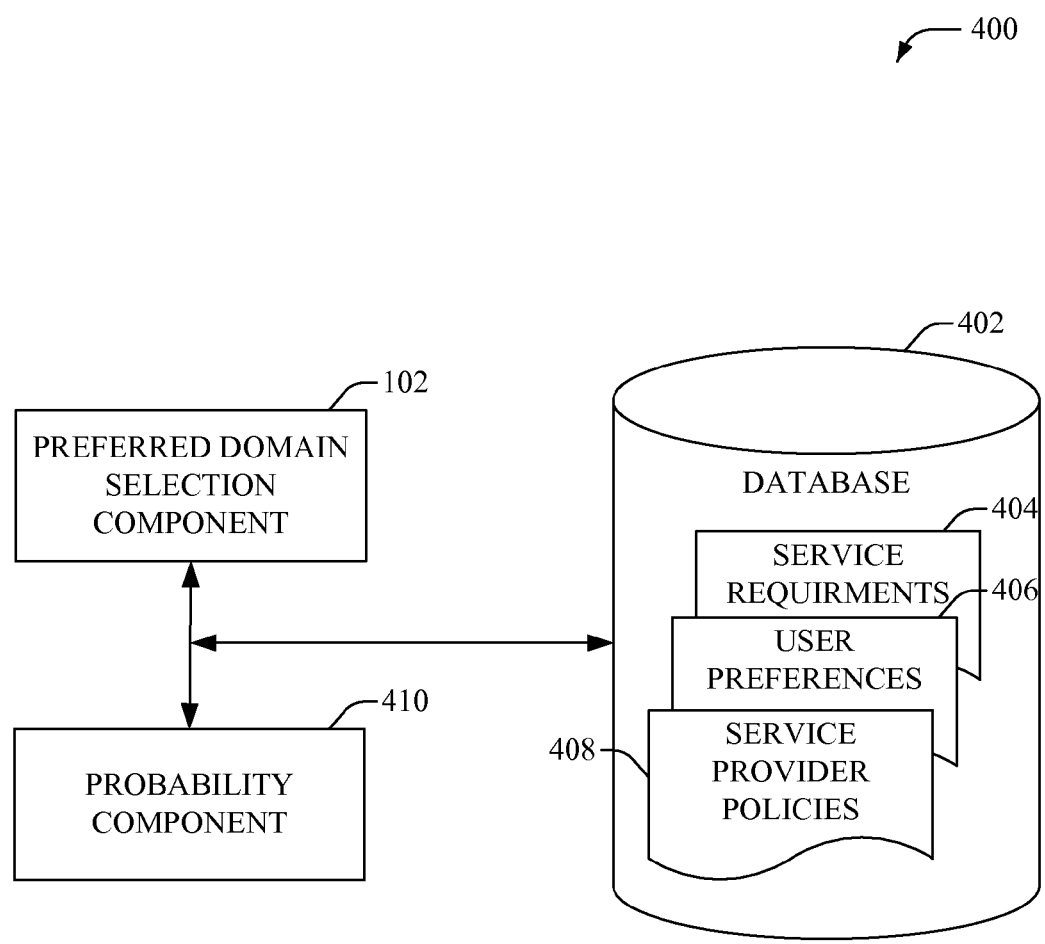
FIG. 4 illustrates an example system that can be employed to identify a domain, which can be utilized for UE communications.

Referring now to FIG. 4, there illustrated is an example system 400 that can be employed to identify a domain for UE communications. The domain selected by system 400 reduces the probability of cross-domain handovers between a femtocell and macro cell, when the UE travels between them. In one example, the preferred domain can be the domain of the macro cell surrounding the femtocell. It can be appreciated that the preferred domain selection component 102 can include functionality, as more fully described herein, for example, with regard to systems 100 and 200.

The preferred domain selection component 102 can determine a preferred domain that can be utilized by a UE for communication, in a manner such that cross-domain handovers are minimized or avoided. According to an aspect, the preferred domain selection component 102 can utilize macro cell domain information (e.g., determined by the macro cell domain determination component 202) to identify the preferred. In one embodiment, the preferred domain selection component 102 can also utilize data stored in a database 402, such as, but not limited to, or service requirements 404 (e.g., QoS) user preferences 406 (e.g., charging considerations), and/or service provider policies 408 (e.g., traffic, congestion, network considerations) to determine preferred domain. Typically, the database can be local or remote and can be updated by a user and/or network operator via most any user interface (e.g., directly or remotely).

It can be appreciated that the database 402 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

In addition, system 400 can include a probability component 410 that can determine a probability that the UE will perform a handover between a femto and macro cell in a given period of time. The probability component 410 can utilize information stored in the database 402, such as, but not limited to, UE specifications, communication history, user behavior patterns, UE location, femtocell location, historical data, etc. (not shown). Further, it can be appreciated that the given period of time can be set by a user and/or network operator and/or dynamically updated to determine an optimal time period. For example, when a UE is attached to a femtocell, the probability component 410 can determine a probability of a handover of the UE from the femtocell to a surrounding macro cell occurring in the next five minutes (or most any time period). In one aspect, the preferred domain selection component 102 can compare the determined probability with a threshold (e.g., set by a user and/or network operator, or automatically determined by employing one or more machine learning techniques). If the probability of a handover is higher than the threshold, the preferred domain selection component 102 can select a preferred domain as the domain of the surrounding macro cell, such that a cross-domain handover is avoided. Alternately, if the probability of a handover is lower or equal to the threshold, the preferred domain selection component 102 can select a preferred domain that can provide the user with the best service experience.

In one aspect, the probability component 410 can determine a probability of a UE travelling from macro to femtocell and vice versa. Based on the determined probability the preferred domain selection component 102 can identify a preferred domain for UE communication for the given time period. For example, when the UE is attached to the femtocell and the probability that the UE will move outside the femto is greater than the predefined threshold, the preferred domain selection component 102 can select the domain of the surrounding macro cell as a preferred domain. In another example, when the UE is within the macro cell, but is located far away from the femtocell and/or is travelling away from the femtocell, then the probability component 410 can determine a low probability that the UE will switch to femtocell. Accordingly, the preferred domain selection component 102 can continue to utilize the domain of the macro cell for communication with the UE.

Consider an exemplary scenario, when the femtocell employs LTE technology and the macro cell employs GSM technology for communication. In this case, the UE can be provided with a richer service experience in the LTE environment but cannot carry the experience into the macro cell environment, if the UE moves outside the femtocell coverage area. According to an aspect, when the probability component 410 determines that a low probability exits for the UE to move into the macro cell, then the preferred domain selection component 102 can select LTE as the preferred domain to provide user with a better service experience. For example, if the femtocell is deployed at a user's home, the probability component 410 determines that the user does not leave the home between 10 PM to 7 AM on weekdays and thus associates a low probability of handover during that time. Accordingly, LTE can be utilized for a call is received and/or initiated by the user via the UE at 11 PM on a Tuesday. Similarly, the probability component 410 can determine that the user typically leaves for work between 7:30-8:00 AM on weekdays and can associate a high probability of handover during that time. Moreover, when call is received and/or initiated by the user via the UE at 7:28 AM, the preferred domain selection component 102 can select GSM as the preferred domain.

Figure 5:
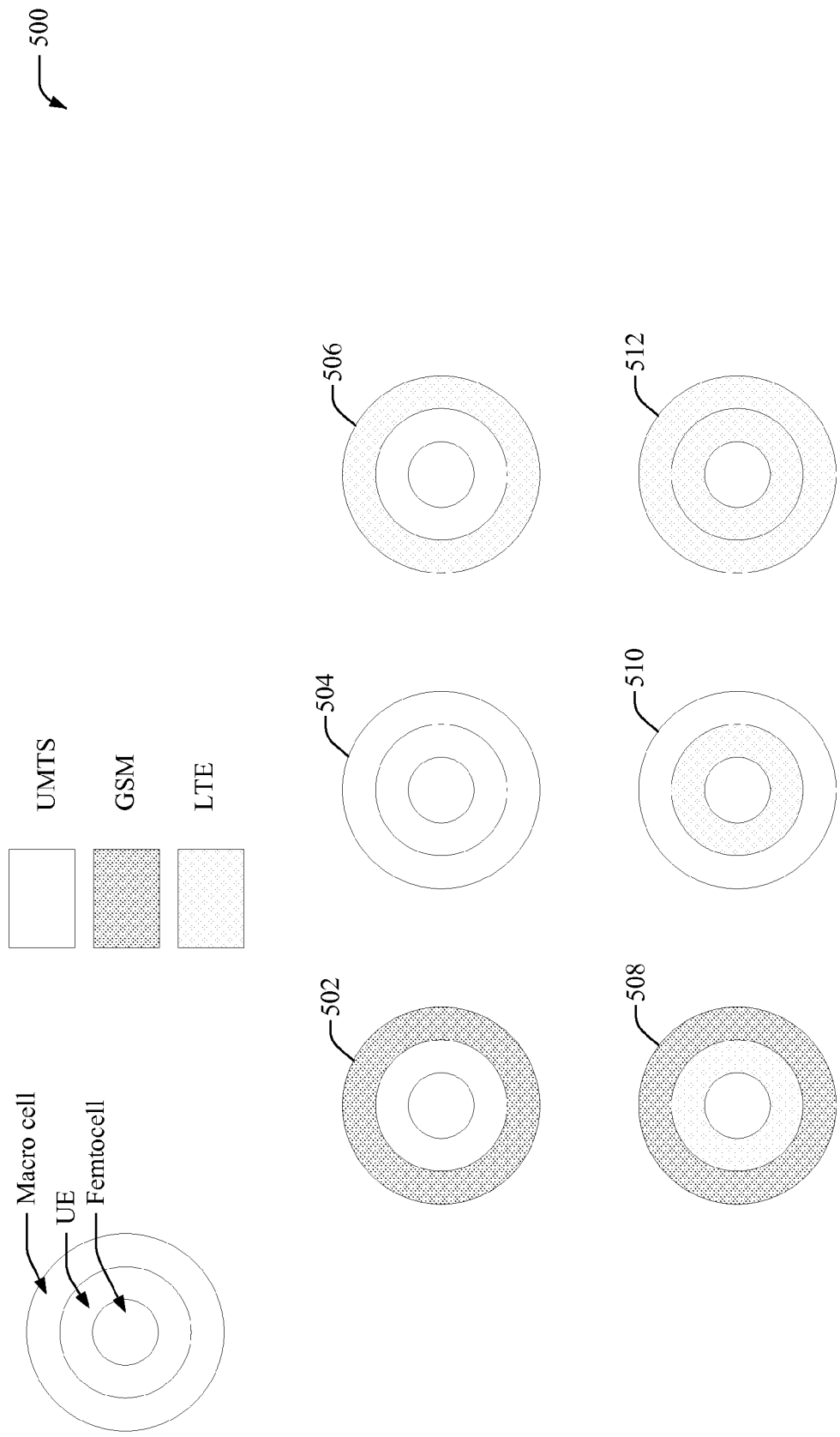
FIG. 5 illustrates example combinations of femtocell, UE, and macro cell radio environments wherein domain selection can be performed in accordance with an aspect of the subject system.

FIG. 5 illustrates example combinations 500 of femtocell, UE, and macro cell radio environments where domain selection can be performed in accordance with an aspect of the subject system. Typically, the UE as disclosed herein can include most any communication device employed by the subscriber, such as, but not limited to, a cellular phone, a personal digital assistant (PDA), a laptop, a personal computer, a media player, a gaming console, and the like. It can be appreciated that although a combination of only three radio environments (UMTS, GSM and LTE) is illustrated most any radio environment can be employed (e.g., WiFi, WiMAX, EV-DO, CDMA, etc.). The signaling and bearer technologies, for example circuit switched (CS) voice, and/or packet switched (PS) voice, in the femtocell and macro cells can be the same or different depending on the radio technologies involved (e.g., UMTS, GSM, and LTE). Moreover, GSM supports only CS voice, UMTS can support PS or CS voice, and LTE supports PS voice.

As seen from FIG. 5, the femtocell can employ UMTS technology in combinations 502-512. In combination 502, the macro cell employs GSM while the UE employs UMTS technology. Further, in combination 504, the macro cell and UE both employ UMTS technology; while in combination 512, the macro cell and UE both employ LTE technology. Furthermore, combination 506 depicts an LTE macro cell and a UMTS UE. In addition, combination 508 depicts a GSM macro cell and an LTE UE, whereas combination 510 depicts a UMTS macro cell and an LTE UE.

In combination 502, the UMTS UE (e.g., cell phone) can be capable of providing CS and/or PS based voice communications. In one example, the UMTS femtocell can be located within the user's home and the macro cell around the home can provide GSM (CS) coverage. When the user is inside home, the UE is attached to the femtocell. Moreover, when a call is received and/or originated from the UE, the UE (e.g., the preferred domain utilization component 104) employs the CS domain instead of the PS domain for communication. In this case, the probability of the user moving out of the home can be high (e.g., determined by the probability component 410) and accordingly the CS domain can be selected as the preferred domain for communication (e.g., by the preferred domain selection component 102). Thus, if the user goes outside his home, for example, on the rear deck, leaving the coverage area of his femtocell, while on his call, the speech call is not disrupted, but rather is handed over from the femtocell to the macro cell, seamlessly and quickly, without a domain change. However, in this example, if the probability of the user moving out of the home is low (e.g., determined by the probability component 410), the CS or PS domain can be selected as the preferred domain for communication (e.g., by the preferred domain selection component 102) based in part on various factors, such as, but not limited to, user preferences, service requirements, service provider policies, etc.

Referring now to combination 506, wherein the user employs a UMTS UE (e.g., cell phone) that is capable of providing either CS or PS based voice communication, and the user employs a UMTS femtocell in his home and the macro cell around his home provides LTE (PS voice) coverage. In one example, when the user is in his home, and the UE is attached to the femtocell, and a call is received and/or originated from the UE, the UE can employ the PS domain instead of the CS domain. Moreover, in this case, the probability of the user moving out of the home can be high (e.g., determined by the probability component 410) and accordingly the PS domain can be selected as the preferred domain for communication (e.g., by the preferred domain selection component 102). Therefore, when the user leaves the coverage area of the femtocell (e.g., moves outside into a parking garage), the call is not disrupted. Instead, the call can be seamlessly handed over from the femtocell to the macro cell without a domain change and thus, domain interworking is avoided. Additionally, when the probability of the user moving out of the home is low (e.g., determined by the probability component 410), the CS or PS domain can be selected as the preferred domain for UE communication (e.g., by the preferred domain selection component 102) based in part on various factors, such as, but not limited to, user preferences, service requirements, service provider policies, etc.

Similarly, for each combination 504, 508-512, when the UE is attached to the femtocell and the probability of the user moving out of the femtocell coverage area is high (e.g., determined by the probability component 410), a domain that is compatible with the surrounding macro cell can be selected as the preferred domain for communication (e.g., by the preferred domain selection component 102). Further, when the probability of the user moving out of the femtocell coverage area is low (e.g., determined by the probability component 410), the CS or PS domain can be selected as the preferred domain for UE communication (e.g., by the preferred domain selection component 102) based in part on various factors, such as, but not limited to, user preferences, service requirements, service provider policies, etc.

According to another embodiment, in each combination 502-512, when a UE is within the macro cell coverage area, and is moving towards the femtocell, or is in close proximity of the femtocell and/or the probability of the user moving into the femtocell coverage area is high (e.g., determined by the probability component 410), a domain that is compatible with the domain of the femtocell can be selected as the preferred domain for UE communication. In addition, when the probability of the user moving into the femtocell coverage area is low (e.g., determined by the probability component 410), the CS or PS domain can be selected as the preferred domain for UE communication (e.g., by the preferred domain selection component 102) based in part on various factors, such as, but not limited to, user preferences, service requirements, service provider policies, etc., for example, to provide a better service experience to the user.

As shown below, Table 1 illustrates exemplary domains that can be employed by UEs with different radio technologies (GSM, UMTS, LTE) when attaching to UMTS femtocells. It can be appreciated that a UMTS or LTE UE can employ the CS or PS domain when attached to UMTS femtocell (e.g., as determined by the preferred domain selection component 102).

TABLE 1

| Macro cell | UE | | |
| --- | --- | --- | --- |
| | GSM | UMTS | LTE |
| GSM | CS | CS | CS |
| UMTS | CS or PS | CS or PS | CS or PS |
| LTE | CS or PS | CS or PS | CS or PS |

Moreover, if the signaling and bearer technologies (domains) employed by the UE in the femtocell and the macro cell are the same, then a handover between the femtocell and the macro cell takes place within the same domain. However, if the technologies (domains) used in the femtocell and macro cell are different, then the handover involves interworking between the different domains, which can introduce additional call processing complexity, consume extra resources and reduce the quality of the user experience. Further, the interworking can restrict the availability of services, for example, innovative supplementary services available in the PS domain may not be available in the CS domain. Thus, systems and method described herein ensure utilization of a preferred domain during UE communications, such that a handover between femto and macro cells takes place in the same domain.

Further, it can be appreciated that although a single macro cell surrounding a femtocell is depicted, a femtocell can have multiple overlapping macro cells, with different technologies. In such a case, the technology to use as the preferred macro cell technology (e.g., determined by the preferred domain selection component 102) can be the domain which is the most service enabling (e.g., LTE is more service enabling than UMTS, which is more service enabling than GSM). In addition, multiple femtocells in an area, for example, a home can also be employed and the domain to be selected (e.g., determined by the preferred domain selection component 102) when a UE originates and/or receives communication is based in part on the surrounding macro cell technology and the UE technology.

Figure 6:
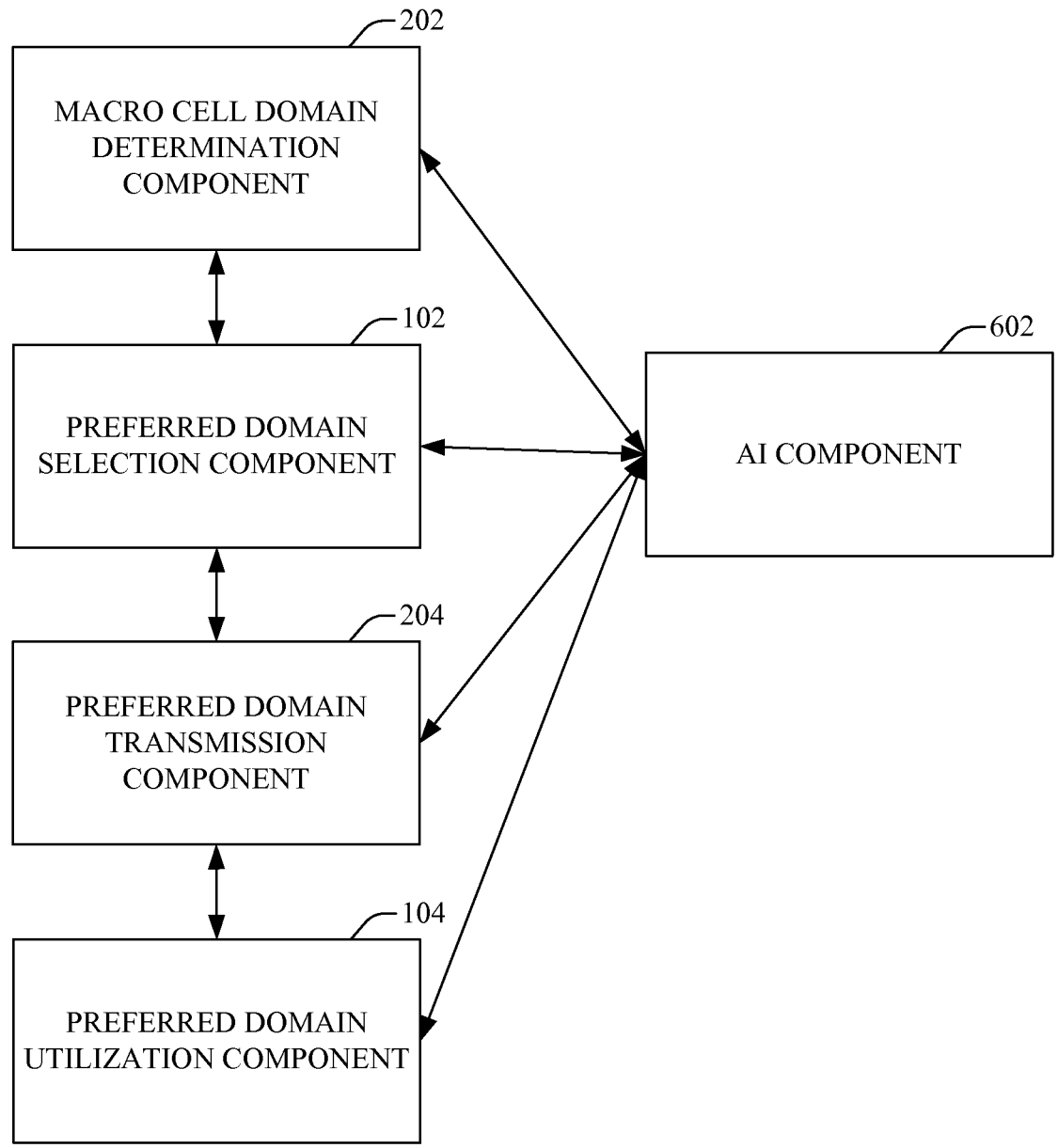
FIG. 6 illustrates example system that facilitates automating one or more features in accordance with the subject innovation.

FIG. 6 illustrates a system 600 that employs an artificial intelligence (AI) component 602, which facilitates automating one or more features in accordance with the subject innovation. It can be appreciated that the macro cell domain determination component 202, preferred domain selection component 102, preferred domain transmission component 204 and preferred domain utilization component 104 can include respective functionality, as more fully described herein, for example, with regard to systems 100, 200, 300 and 400.

The subject innovation (e.g., in connection with domain selection) can employ various AI-based schemes for carrying out various aspects thereof. For example, a process for determining when the UE is travelling between a femtocell and macro cell, and/or which domain can be selected as a preferred domain, etc. can be facilitated via an automatic classifier system and process. Moreover, where the femtocell, UE and macro cell that surrounds the femtocell utilize different radio technologies, the classifier can be employed to determine which domain can be selected for initiating communications associated with the UE.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information stored in the database 402 (FIG. 4) or other data-specific attributes derived from the stored information, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the UE is likely to move into and/or out of a femtocell coverage area, which domain can be utilized for UE communication, etc. The criteria can include, but is not limited to, historical patterns, user behavior, location of the UE, motion of the UE, location of the femtocell, time, date, etc.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
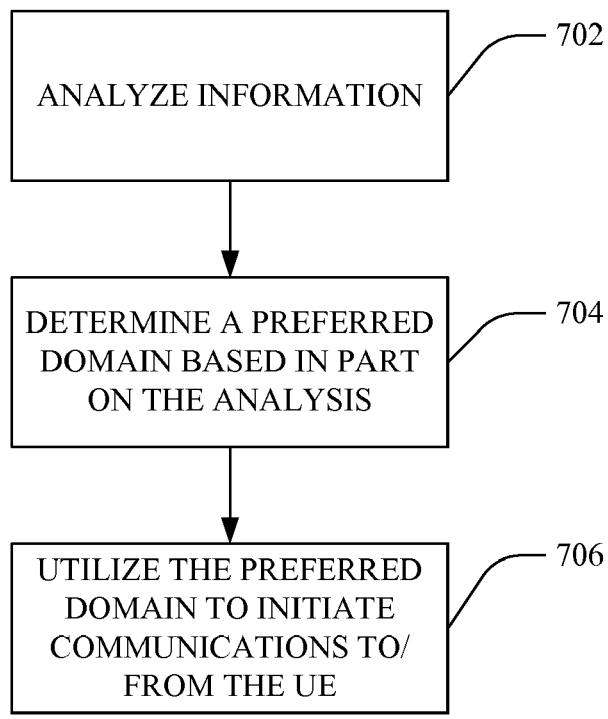
FIG. 7 illustrates an example methodology that can be utilized to minimize cross-domain handovers between femtocells and surrounding macro cells.

Referring now to FIG. 7, illustrated is an example methodology 700 that can be utilized to minimize cross-domain handovers between femtocells and surrounding macro cells, according to the subject disclosure. At 702, information can be analyzed. The information can include, but is not limited to, macro cell domain information, location data associated with the femtocell and/or UE, communication history, user and/or service provider preferences, policies, service requirements, historical data, UE behavior patterns, probability of handover, etc. At 704, a preferred domain can be determined based in part on the analysis. The preferred domain can reduce the probability of performing a cross-domain handover. In one aspect, if the probability of performing a handover between the femtocell and macro cell is low, the preferred domain can be a domain that provides a user with the best service experience.

At 706, the preferred domain can be utilized, for example, by the UE or the femtocell to initiate communications to/from the UE. For example, the preferred domain is employed when a call is originated from the UE and/or received at the UE. In one aspect, the utilization of the preferred domain can enable a handover in the same domain and thus reduce complexity and conserve resources.

Figure 8:
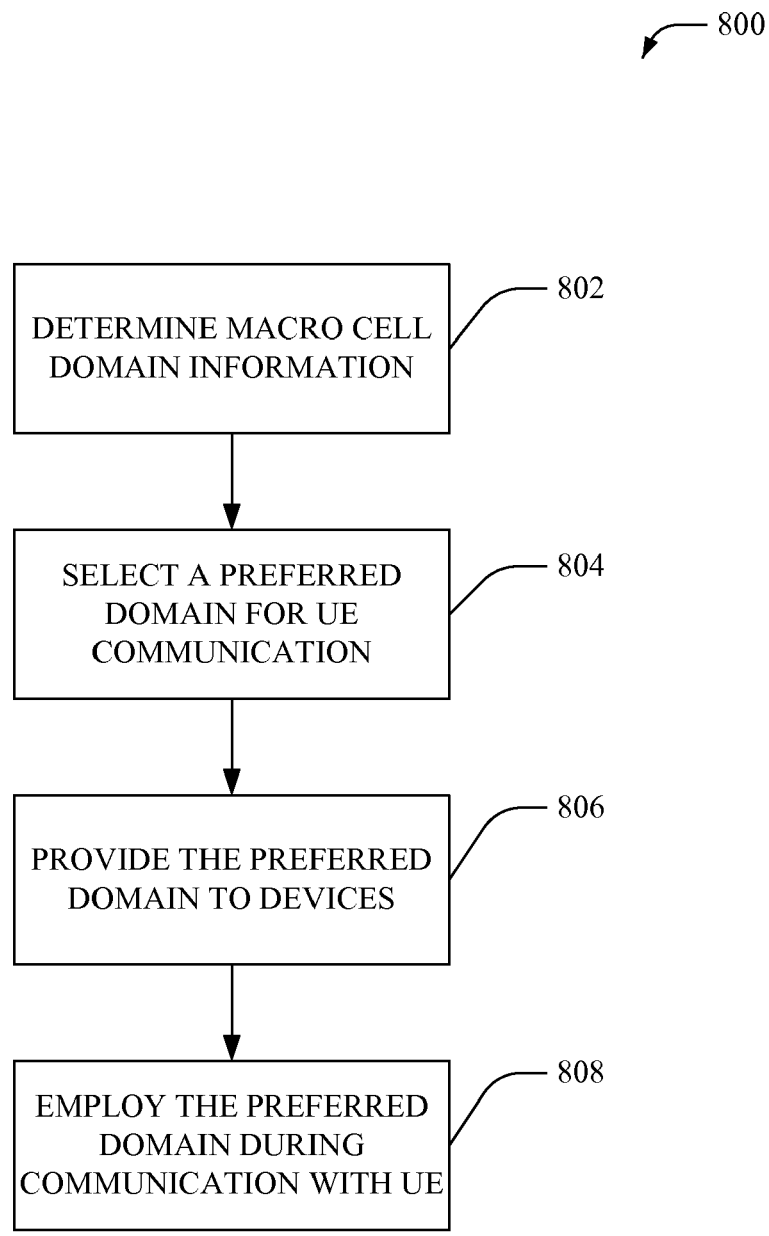
FIG. 8 illustrates an example methodology that facilitates handovers between a femtocell and a surrounding macro cell to be performed in the same domain.

FIG. 8 illustrates an example methodology 800 that facilitates handovers between a femtocell and a surrounding macro cell to be performed in a common domain in accordance with an aspect of the subject disclosure. At 802, the domain of the macro cell can be determined, for example, based on the radio technologies involved (e.g., UMTS, GSM, LTE, etc.). In one aspect, the macro cell domain can be determined by, such as, but not limited to network planning radio coverage tools and/or maps. In another aspect, the macro cell domain can be determined by radio signal detection, for example, by the femtocell and/or the UE. Additionally or alternately, communication history can also be utilized to determine the macro cell domain. It can be appreciated that a combination of the above aspects can be employed to facilitate macro cell domain determination.

At 804, a preferred domain can be selected for UE communication. In one embodiment, the preferred domain can be selected based in part on the determined macro cell domain. Additionally, probability of handover, geographical location of femtocell and/or UE, communication history, user and/or service provider preferences and/or policies, service requirements, UE behavior patterns, etc., can be employed to select the preferred domain. At 806, the selected preferred domain can be provided to devices, for example, the UE and/or the femtocell. As an example, the selected preferred domain can be provided to devices during pre-configuration, by broadcasting the information by wireless communication, by employing a dedicated channel and/or signal, via SMS messaging, via application layer messaging, etc. At 808, the selected preferred domain can be utilized during communication with the UE. As an example, the preferred domain can be utilized when a call is originated from the UE and/or received at the UE, such that, if a handover between a femtocell and macro cell occurs during the call, the handover can be performed in the same domain.

Figure 9:
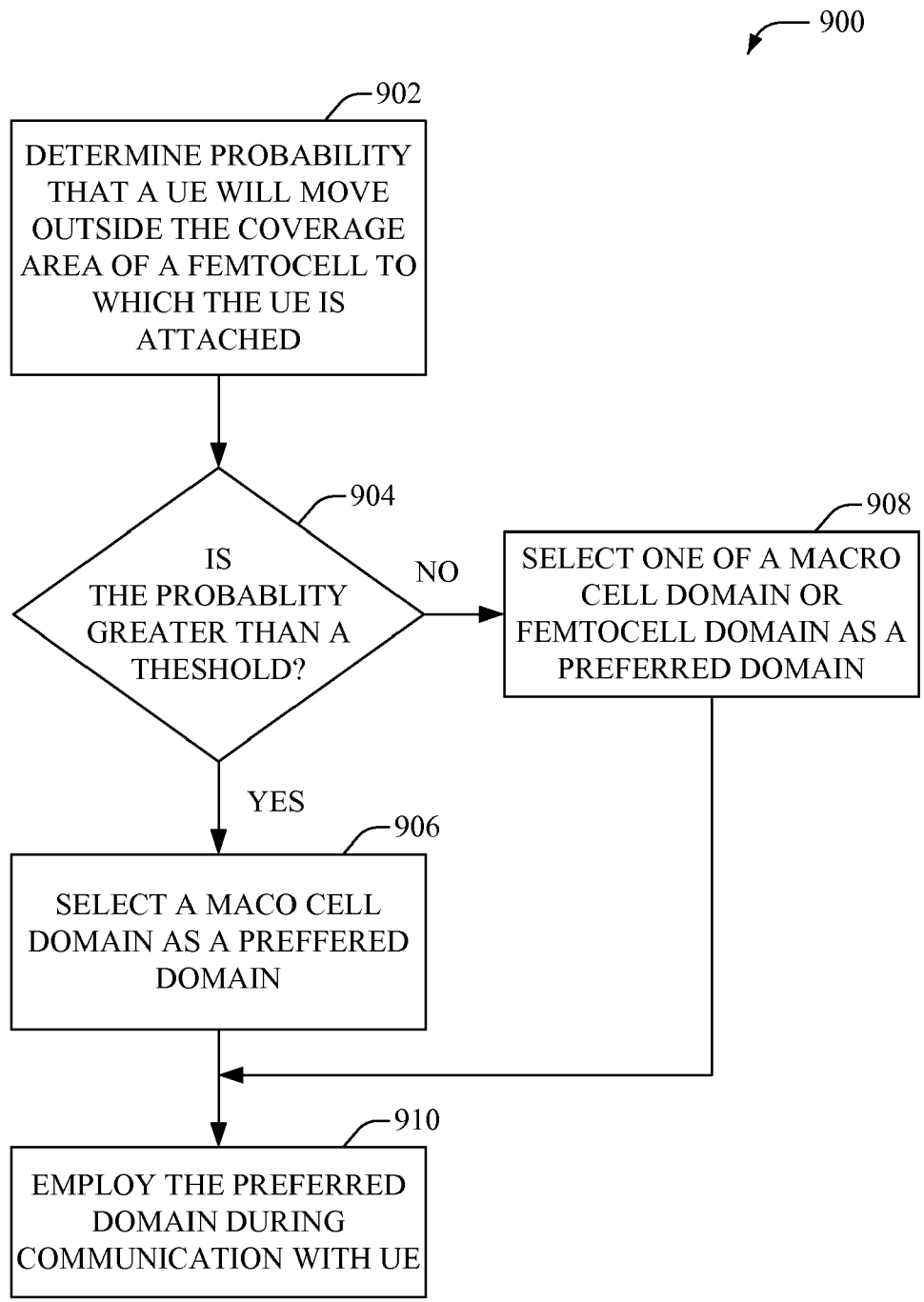
FIG. 9 illustrates an example methodology that facilitates same-domain handovers when a UE moves from a femtocell into a surrounding macro cell.

FIG. 9 illustrates an example methodology 900 that facilitates same domain handovers when a UE moves from a femtocell to a surrounding macro cell, according to an aspect of the subject innovation. It can be appreciated that the UE can be most any wireless communication device that can be authorized to access and attach to the femtocell. At 902, a probability that the UE, which is attached to the femtocell, will move outside the femtocell coverage area can be determined. According to an aspect, the probability can be determined based in part on UE specifications, communication history, user behavior patterns, UE location, UE motion, femtocell location, historical data, etc. For example, if a femtocell is deployed within an office, and a user works at the office between 9 AM to 5 PM on weekdays, the probability that the UE will move out of the femtocell coverage area at 5 PM on weekdays can be determined as high.

At 904, it can be determined whether the determined probability is greater than a threshold. For example, the threshold can be set by a network operator, service provider, a user and/or dynamically updated by employing one or more machine learning techniques. At 906, the macro cell domain can be selected as a preferred domain when the probability of handover is greater than the threshold. Accordingly, a handover can occur in the same domain and complexities associated with cross-domain handovers can be avoided. Alternately, when the probability that the UE will move out of the femtocell coverage area is low, a preferred domain can be selected based on desired user experience, for example, specified by the user. At 908, one of the macro cell domain or femtocell domain can be selected as a preferred domain, such that the UE can be provided with a better service experience. For example, when the femtocell employs LTE technology, the macro cell employs GSM technology for communication, and the probability that the UE to moves from the femtocell into the macro cell is lower than (or equal to) the threshold, LTE can be selected as the preferred domain since the UE can be provided with a richer service experience in the LTE environment (as compared to GSM). At 910, the preferred domain can be utilized during communication with the UE, for example, while initiating voice calls.

Figure 10:
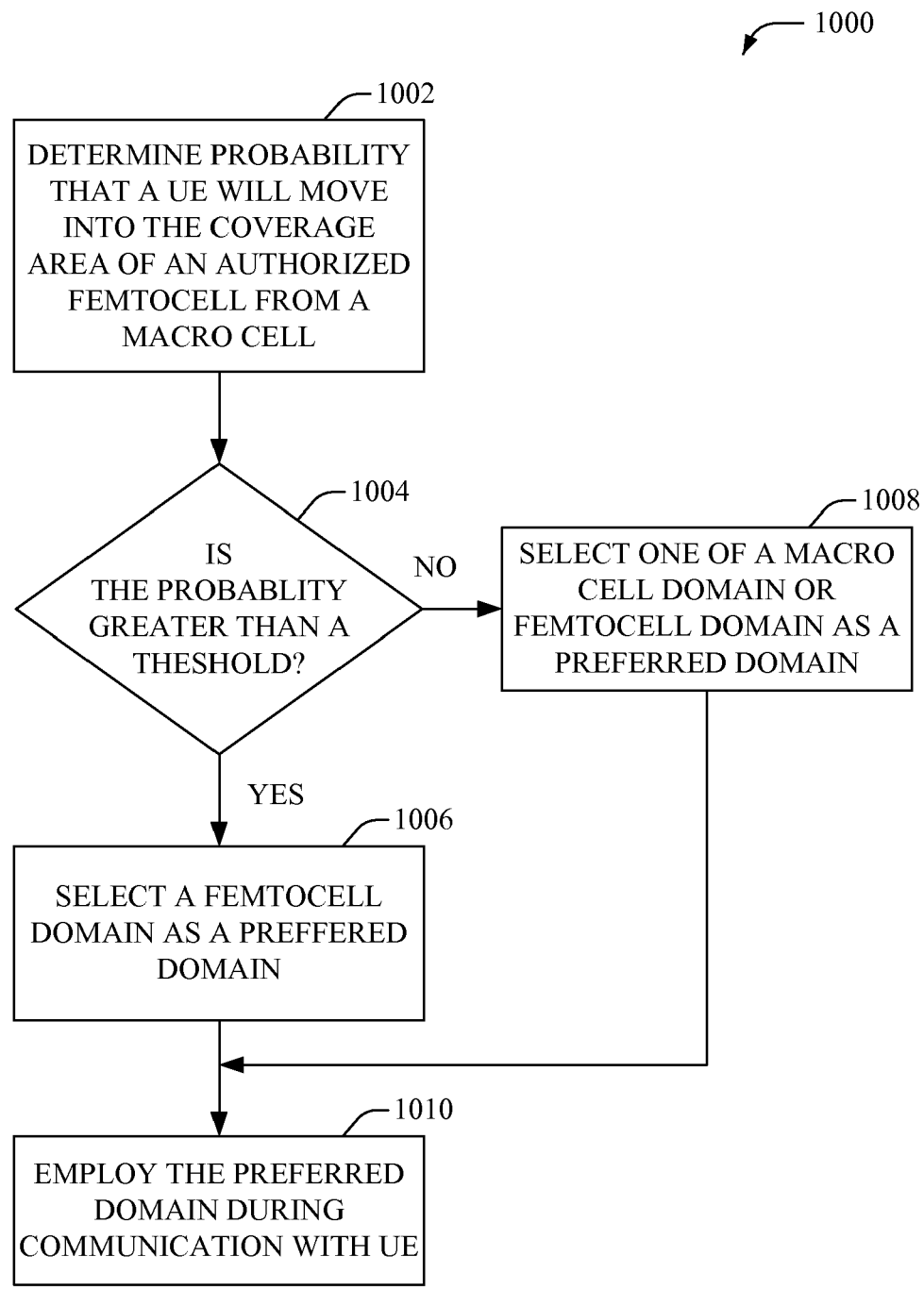
FIG. 10 illustrates an example methodology that facilitates same-domain handovers when a UE moves from a macro cell into a femtocell.

FIG. 10 illustrates an example methodology 1000 that facilitates same-domain handovers when a UE moves from a macro cell to a femtocell, according to an aspect of the subject innovation. It can be appreciated that the UE can be most any wireless communication device that can be authorized to access and attach to the femtocell. At 1002, a probability that the UE will move into the coverage area of an authorized femtocell can be determined. According to an aspect, the probability can be determined based in part on UE specifications, communication history, user behavior patterns, UE location, UE motion, femtocell location, historical data, etc. Continuing with the example discussed with respect to FIG. 9, if a femtocell is deployed within an office, and a user works at the office between 9 AM to 5 PM on weekdays, the probability that the UE will move into the femtocell coverage area at 9 PM on weekdays can be determined as high.

At 1004, it can be determined whether the determined probability is greater than a threshold. Moreover, the threshold can be set by a network operator, service provider, a user and/or dynamically updated by employing one or more machine learning techniques. At 1006, the femtocell domain can be selected as a preferred domain when the probability of handover is greater than the threshold. Thus, a handover from the macro cell to the femtocell can occur in the same domain. Alternately, at 1008, one of the macro cell or femtocell domains can be selected as a preferred domain, when determined the probability that the UE will move into the femtocell coverage area is lower than the threshold. According to an aspect, the selection is based in part of service experience provided by the macro cell or femtocell. At 1010, the preferred domain can be utilized during communication with the UE, for example, while initiating voice calls.

Figure 11:
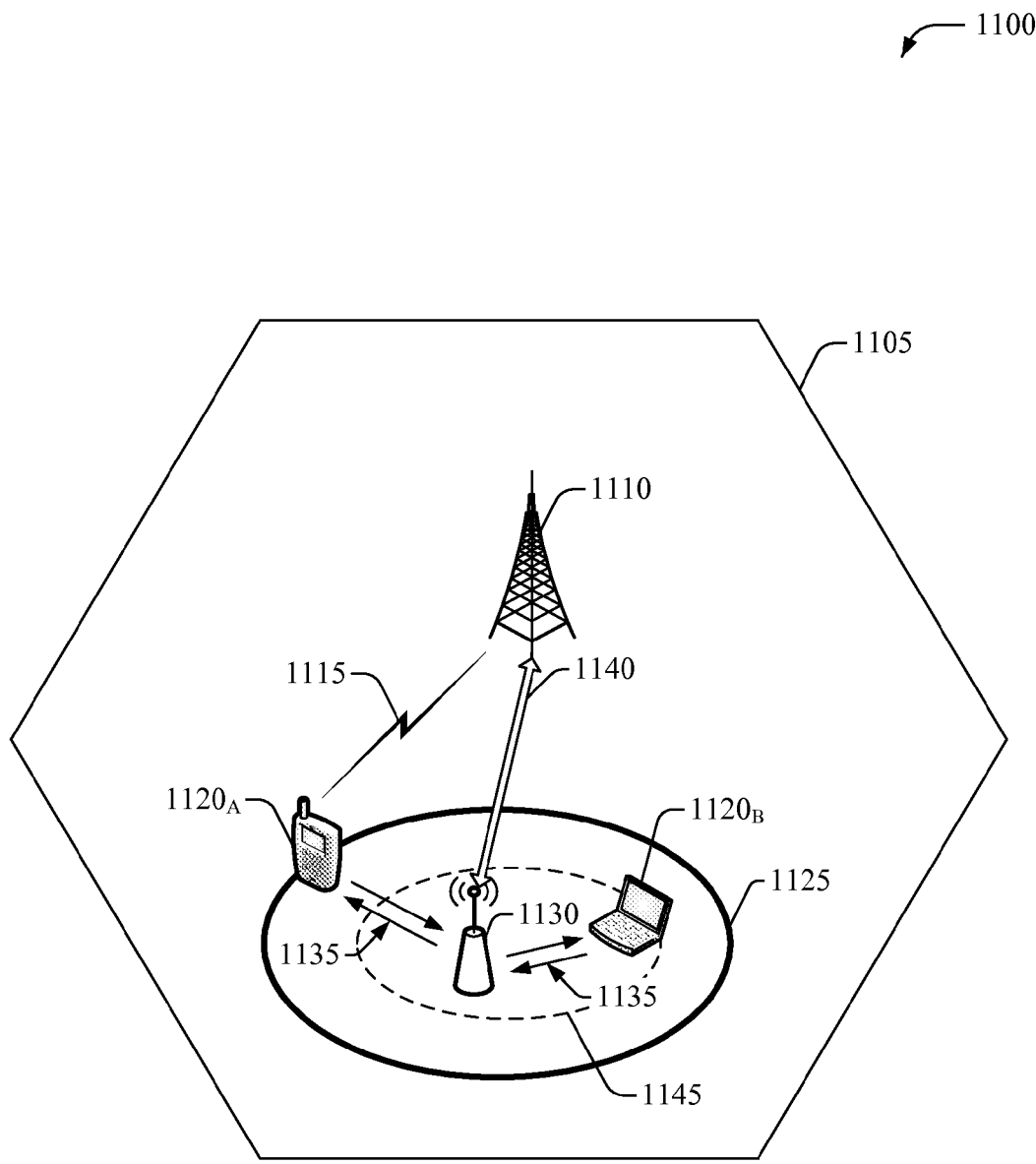
FIG. 11 illustrates an example wireless communication environment with associated components for operation of a femtocell in accordance with the subject specification.

FIG. 11 illustrates a schematic wireless environment 1100 (e.g., a network) in which a femtocell can exploit various aspects of the subject innovation in accordance with the disclosed subject matter. In wireless environment 1100, area 1105 can represent a coverage macro cell, which can be served by base station 1110. Macro coverage is generally intended for outdoors locations for servicing mobile wireless devices, like UE 1120$_A$, and such coverage is achieved via a wireless link 1115. In an aspect, UE 1120 can be a 3GPP Universal Mobile Telecommunication System (UMTS) mobile phone.

Within macro coverage cell 1105, a femtocell 1145, served by a femto access point 1130, can be deployed. A femtocell typically can cover an area 1125 that is determined, at least in part, by transmission power allocated to femto AP 1130, path loss, shadowing, and so forth. Coverage area typically can be spanned by a coverage radius that ranges from 20 to 50 meters. Confined coverage area 1145 is generally associated with an indoors area, or a building, which can span about 5000 sq. ft. Generally, femto AP 1130 typically can service a number (e.g., a few or more) wireless devices (e.g., subscriber station 1120$_B$) within confined coverage area 1145. In an aspect, femto AP 1130 can integrate seamlessly with substantially any PS-based and CS-based network; for instance, femto AP 1130 can integrate into an existing 3GPP Core via conventional interfaces like Iu-CS, Iu-PS, Gi, Gn. In another aspect, femto AP 1130 can exploit high-speed downlink packet access in order to accomplish substantive bitrates. In yet another aspect, femto AP 1130 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE $1120_A$, leaves macro coverage (e.g., cell 1105) and enters femto coverage (e.g., area 1115), as illustrated in environment 1100, UE $1120_A$ can attempt to attach to the femto AP 1130 through transmission and reception of attachment signaling, effected via a FL/RL 1135; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1120 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto access point 1130) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1120 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 1120 can be allowed on femtocell 1125 and incoming voice and data traffic can be paged and routed to the subscriber station through the femto AP 1130. It is to be noted also that data traffic is typically routed through a backhaul broadband wired network backbone 1140 (e.g., optical fiber backbone, twisted-pair line, T1/E1 phone line, DSL, or coaxial cable). It is to be noted that as a femto AP 1130 generally can rely on a backhaul network backbone 1140 for routing and paging, and for packet communication, substantially any quality of service can handle heterogeneous packetized traffic. Namely, packet flows established for wireless communication devices (e.g., terminals $1120_A$ and $1120_B$) served by femto AP 1130, and for devices served through the backhaul network pipe 1140. It is to be noted that to ensure a positive subscriber experience, or perception, it is desirable for femto AP 1130 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1125 or area 1145).

Figure 12:
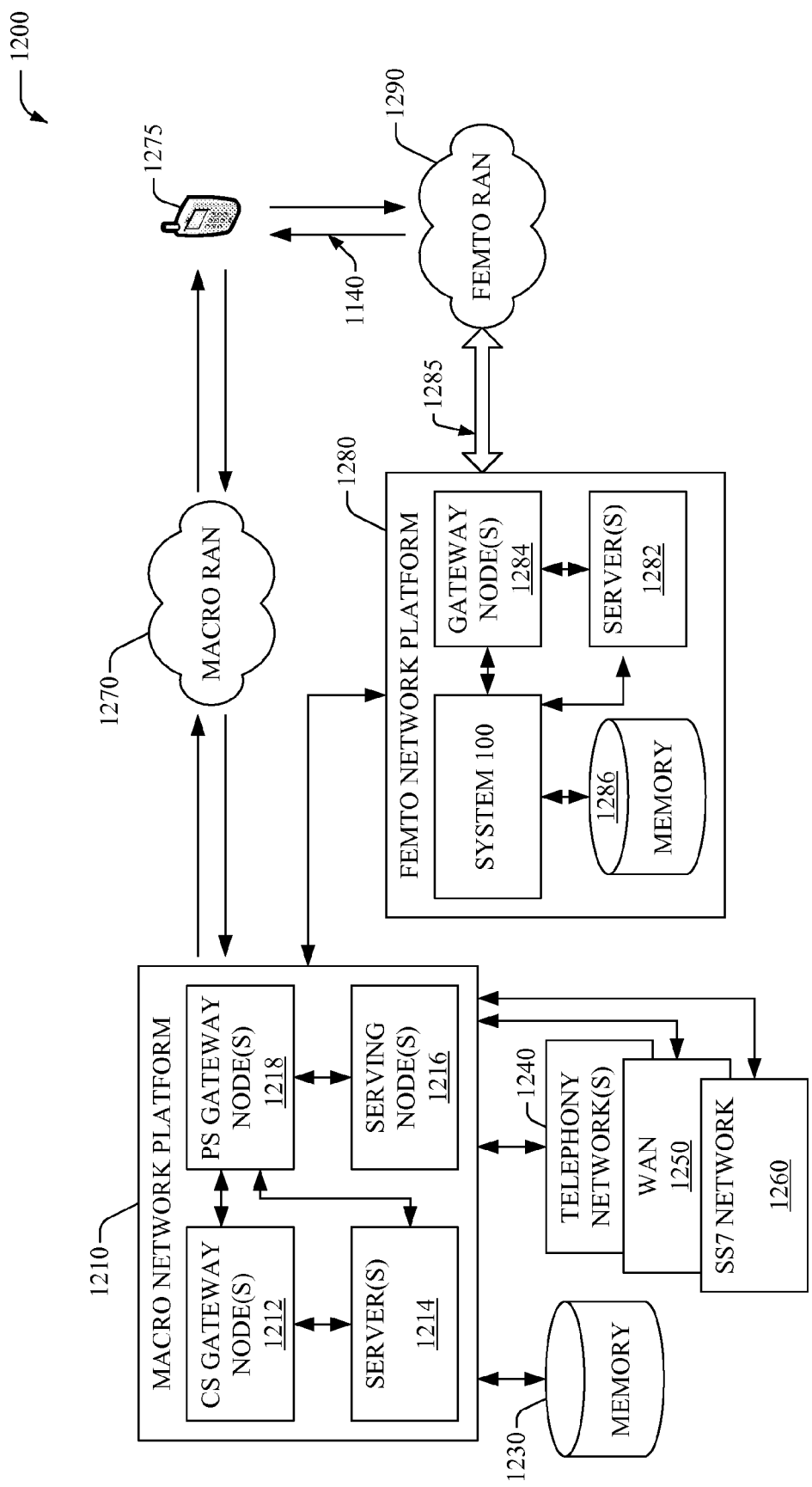
FIG. 12 illustrates a schematic deployment of a macro cell and a femtocell for wireless coverage in accordance with aspects of the disclosure.
Figure 13:
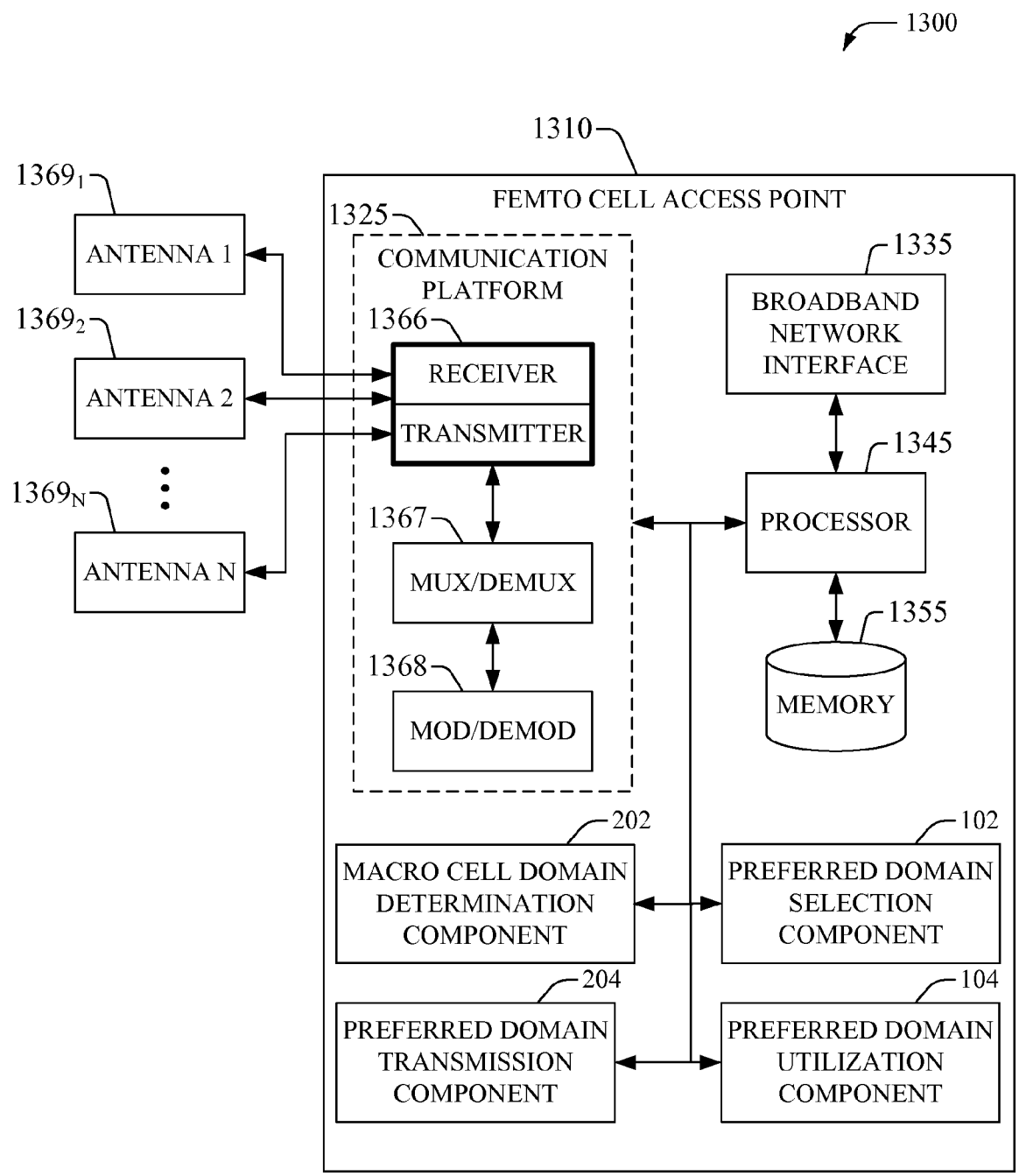
FIG. 13 illustrates an example embodiment of a femto access point that can facilitate selection and utilization of a preferred domain for UE communication, according to the subject disclosure.

To provide further context for various aspects of the subject specification, FIGS. 12 and 13 illustrate, respectively, an example wireless communication environment 1200, with associated components for operation of a femtocell, and a block diagram of an example embodiment 1300 of a femto access point which can facilitate domain selection in accordance with aspects described herein.

Wireless communication environment 1200 includes two wireless network platforms: (i) A macro network platform 1210 that serves, or facilitates communication) with user equipment 1275 via a macro radio access network (RAN) 1270. It should be appreciated that in cellular wireless technologies (e.g., 3GPP UMTS, HSPA, 3GPP LTE, 3GPP UMB), macro network platform 1210 is embodied in a Core Network. (ii) A femto network platform 1280, which can provide communication with UE 1275 through a femto RAN 1290 linked to the femto network platform 1280 via backhaul pipe(s) 1285, wherein backhaul pipe(s) are substantially the same a backhaul link 1140. It should be appreciated that femto network platform 1280 typically offloads UE 1275 from macro network, once UE 1275 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 1105, while femto RAN 1290 can comprise multiple femto-cell access points. As mentioned above, it is to be appreciated that deployment density in femto RAN 1290 is substantially higher than in macro RAN 1270.

Generally, both macro and femto network platforms 1210 and 1280 include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1210 includes CS gateway node(s) 1212 which can interface CS traffic received from legacy networks like telephony network(s) 1240 (e.g., public switched telephone network (PSTN), or public land mobile network (PLMN)) or a SS7 network 1260. Moreover, CS gateway node(s) 1212 interfaces CS-based traffic and signaling and gateway node(s) 1218.

In addition to receiving and processing CS-switched traffic and signaling, gateway node(s) 1218 can authorize and authenticate PS-based data sessions with served (e.g., through macro RAN) wireless devices. Data sessions can include traffic exchange with networks external to the macro network platform 1210, like wide area network(s) (WANs) 1250; it should be appreciated that local area network(s) (LANs) can also be interfaced with macro network platform 1210 through gateway node(s) 1218. Gateway node(s) 1218 generates packet data contexts when a data session is established. It should be further appreciated that the packetized communication can include multiple flows that can be generated through server(s) 1214. Macro network platform 1210 also includes serving node(s) 1216 that convey the various packetized flows of information, or data streams, received through gateway node(s) 1218. It is to be noted that server(s) 1214 can include one or more processor configured to confer at least in part the functionality of macro network platform 1210. To that end, the one or more processor can execute code instructions stored in memory 1230, for example.

In example wireless environment 1200, memory 1230 stores information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN(s) 1250, or SS7 network 1260.

Femto gateway node(s) 1284 have substantially the same functionality as PS gateway node(s) 1218. Additionally, femto gateway node(s) 1284 can also include substantially all functionality of serving node(s) 1216. In an aspect, femto gateway node(s) 1284 facilitates handover resolution, e.g., assessment and execution. Server(s) 1282 have substantially the same functionality as described in connection with server(s) 1214 and can include one or more processor configured to confer at least in part the functionality of macro network platform 1210. To that end, the one or more processor can execute code instructions stored in memory 1286, for example.

Memory 1286 can include information relevant to operation of the various components of femto network platform 1280. For example operational information that can be stored in memory 1286 can comprise, but is not limited to, subscriber information; contracted services; maintenance and service records; femtocell configuration (e.g., devices served through femto RAN 1290; access control lists, or white lists); service policies and specifications; privacy policies; add-on features; and so forth. Further, it can be appreciated that the femto network platform 1280 can include system 100, described in detail with respect to FIG. 1, which can be employed to utilize a preferred domain during communication with UE 1275, according to an aspect of the subject innovation.

With respect to FIG. 13, in example embodiment 1300, femtocell AP 1310 can receive and transmit signal(s) (e.g., traffic and control signals) from and to wireless devices, access terminals, wireless ports and routers, etc., through a set of antennas $1369_1$-$1369_N$. It should be appreciated that while antennas $1369_1$-$1369_N$ are a part of communication platform 1325, which comprises electronic components and associated circuitry that provides for processing and manipulating of received signal(s) (e.g., a packet flow) and signal(s) (e.g., a broadcast control channel) to be transmitted. In an aspect, communication platform 1325 includes a transmitter/receiver (e.g., a transceiver) 1366 that can convert signal(s) from analog format to digital format upon reception, and from digital format to analog format upon transmission. In addition, receiver/transmitter 1366 can divide a single data stream into multiple, parallel data streams, or perform the reciprocal operation. Coupled to transceiver 1366 is a multiplexer/demultiplexer 1367 that facilitates manipulation of signal in time and frequency space. Electronic component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1367 can scramble and spread information (e.g., codes) according to substantially any code known in the art; e.g., Hadamard-Walsh codes, Baker codes, Kasami codes, polyphase codes, and so on. A modulator/demodulator 1368 is also a part of operational group 1325, and can modulate information according to multiple modulation techniques, such as frequency modulation, amplitude modulation (e.g., Mary quadrature amplitude modulation (QAM), with M a positive integer), phase-shift keying (PSK), and the like.

Femto access point 1310 also includes a processor 1345 configured to confer functionality, at least partially, to substantially any electronic component in the femto access point 1310, in accordance with aspects of the subject innovation. In particular, processor 1345 can facilitate femto AP 1310 to implement configuration instructions received through communication platform 1325, which can include storing data in memory 1355. In addition, processor 1345 facilitates femto AP 1310 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1345 can manipulate antennas $1369_1$-$1369_N$ to facilitate beamforming or selective radiation pattern formation, which can benefit specific locations (e.g., basement, home office . . . ) covered by femto AP; and exploit substantially any other advantages associated with smart-antenna technology. Memory 1355 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1355 can store configuration information such as schedules and policies; femto AP address(es) or geographical indicator(s); access lists (e.g., white lists); license(s) for utilization of add-features for femto AP 1310, and so forth.

In embodiment 1300, processor 1345 is coupled to the memory 1355 in order to store and retrieve information necessary to operate and/or confer functionality to communication platform 1325, broadband network interface 1335 (e.g., a broadband modem), and other operational components (e.g., multimode chipset(s), power supply sources . . . ; not shown) that support femto access point 1310. The femto AP 1310 can further include a macro cell domain determination component 202, preferred domain selection component 102, preferred domain transmission component 204 and preferred domain utilization component 104, which can include respective functionality, as more fully described herein, for example, with regard to systems 100, 200, 300, 400, and 600.

In addition, it is to be noted that the various aspects disclosed in the subject specification can also be implemented through (i) program modules stored in a computer-readable storage medium or memory (e.g., memory 1286 or memory 1355) and executed by a processor (e.g., processor 1345), or (ii) other combination(s) of hardware and software, or hardware and firmware.

Figure 14:
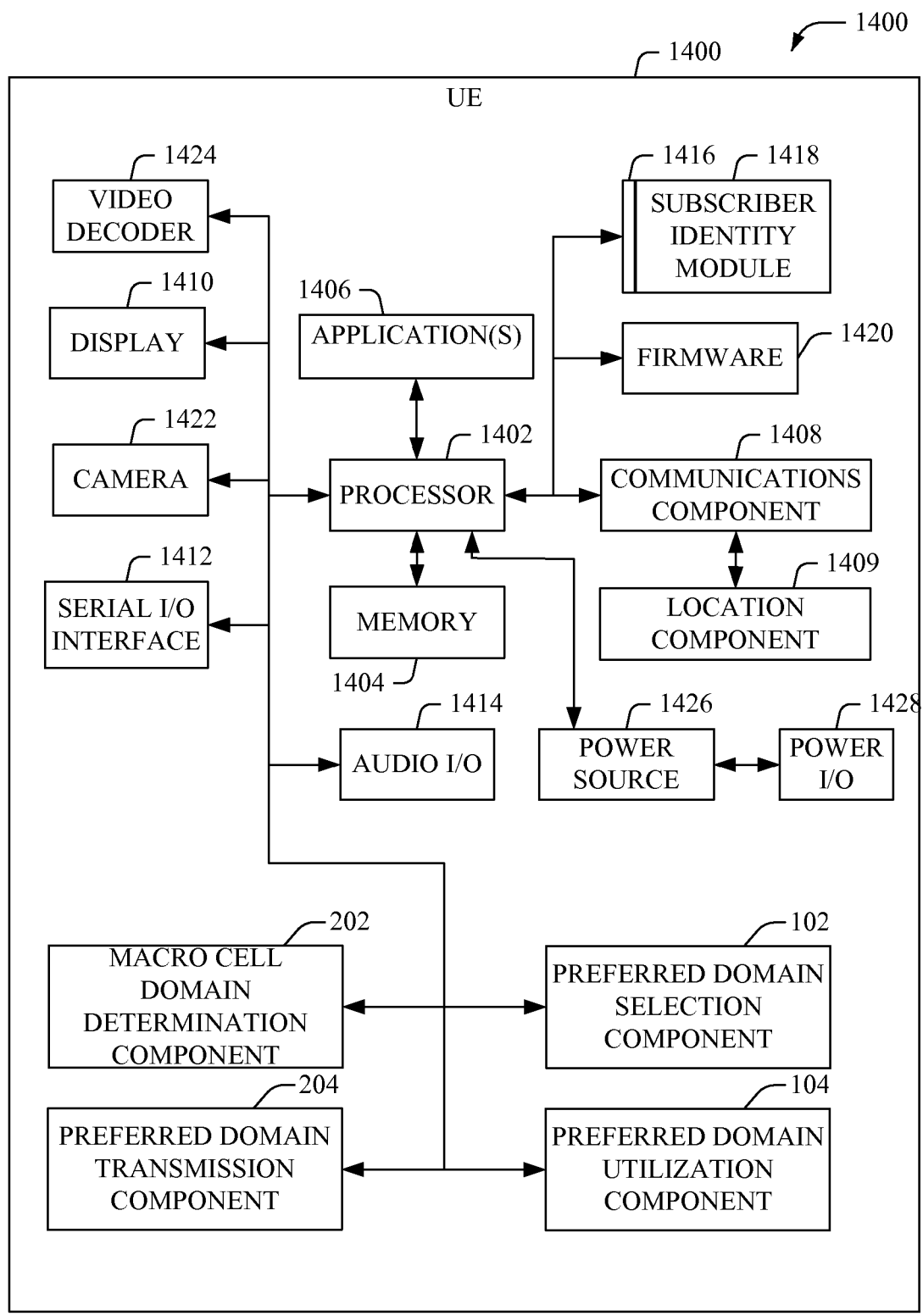
FIG. 14 illustrates a block diagram of a UE suitable for domain selection in accordance with the innovation.

Referring now to FIG. 14, there is illustrated a block diagram of a UE 1400 suitable for domain selection in accordance with the innovation. The UE 1400 can include a processor 1402 for controlling all onboard operations and processes. A memory 1404 can interface to the processor 1402 for storage of data and one or more applications 1406 being executed by the processor 1402. A communications component 1408 can interface to the processor 1402 to facilitate wired/wireless communication with external systems (e.g., femtocell and macro cell). The communications component 1408 interfaces to a location component 1409 (e.g., GPS transceiver) that can facilitate location detection of the UE 1400. Note that the location component 1409 can also be included as part of the communications component 1408.

The UE 1400 can include a display 1410 for displaying content downloaded and/or for displaying text information related to operating and using the device features. A serial I/O interface 1412 is provided in communication with the processor 1402 to facilitate serial communication (e.g., USB, and/or IEEE 1394) via a hardwire connection. Audio capabilities are provided with an audio I/O component 1414, which can include a speaker for the output of audio signals related to, for example, recorded data or telephony voice data, and a microphone for inputting voice signals for recording and/or telephone conversations.

The device 1400 can include a slot interface 1416 for accommodating a subscriber identity module (SIM) 1418. Firmware 1420 is also provided to store and provide to the processor 1402 startup and operational data. The UE 1400 can also include an image capture component 1422 such as a camera and/or a video decoder 1424 for decoding encoded multimedia content. The UE 1400 can also include a power source 1426 in the form of batteries, which power source 1426 interfaces to an external power system or charging equipment via a power I/O component 1428. In addition, the UE 1400 can include a macro cell domain determination component 202, preferred domain selection component 102, preferred domain transmission component 204 and preferred domain utilization component 104, which can include respective functionality, as more fully described herein, for example, with regard to systems 100, 200, 300, 400, and 600.

Figure 15:
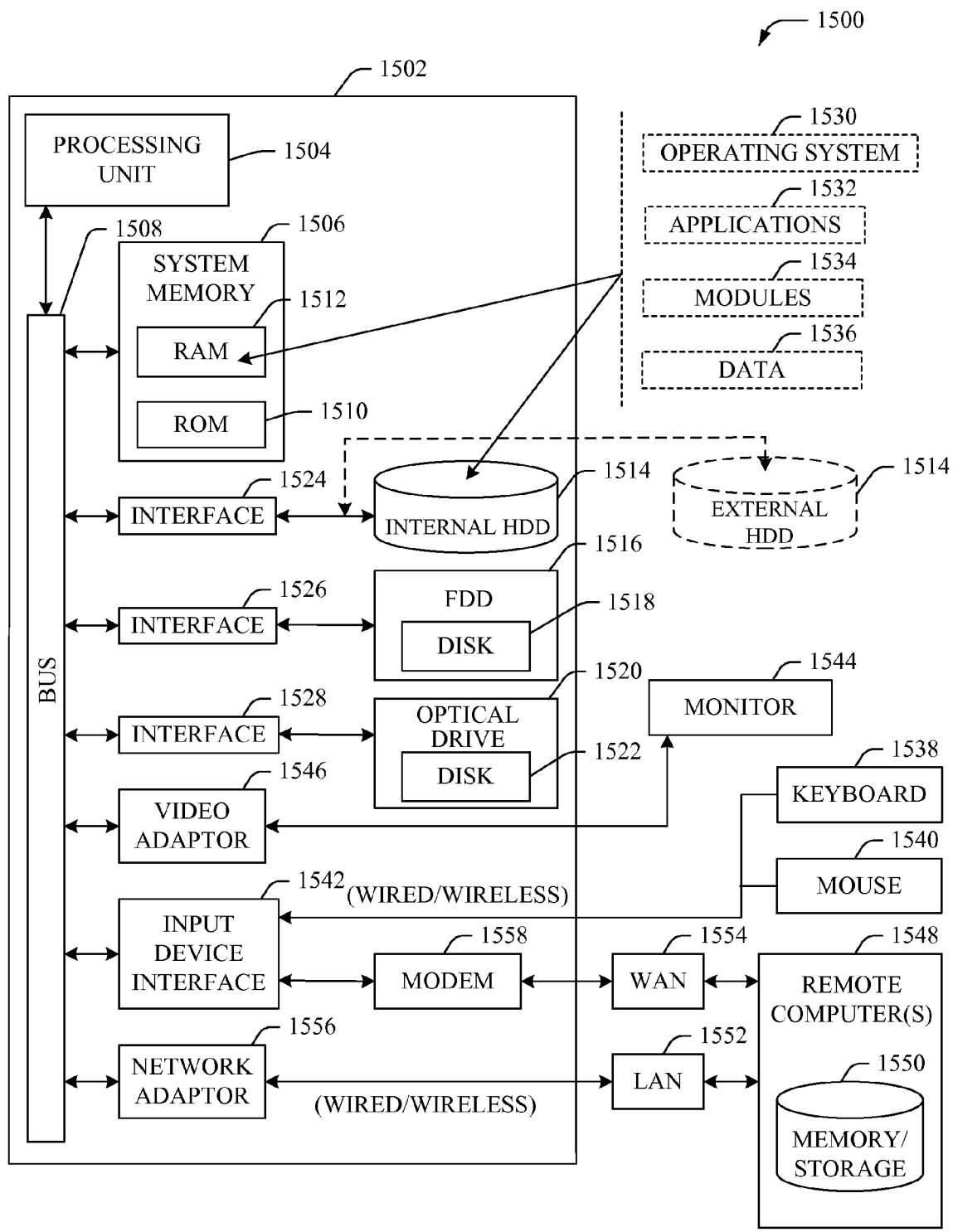
FIG. 15 illustrates a block diagram of a computer operable to execute the disclosed communication architecture.

Referring now to FIG. 15, there is illustrated a block diagram of a computer operable to execute the disclosed communication architecture. In order to provide additional context for various aspects of the subject specification, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the example environment 1500 for implementing various aspects of the specification includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the specification can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 is connected to the local network 1552 through a wired and/or wireless communication network interface or adapter 1556. The adapter 1556 can facilitate wired or wireless communication to the LAN 1552, which can also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are example and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor that facilitates execution of computer executable components stored on at least one computer readable medium, the computer executable components, comprising:
a preferred domain selection component that determines a preferred domain for communication associated with a user equipment, the preferred domain includes a preferred radio access technology that is common to a femtocell and a macro cell;
a probability component that determines a probability of the user equipment performing a handover between the femtocell and the macro cell; and
a preferred domain utilization component that initiates a communication associated with the user equipment by employing the preferred domain, prior to the handover and in response to the probability meeting a predetermined criterion.

2. The system of claim 1, wherein the preferred domain selection component employs a communication history of the user equipment to determine the preferred domain.

3. The system of claim 1, further comprising: a macro cell domain determination component that identifies a domain of the macro cell, wherein the preferred domain selection component employs the domain of the macro cell to determine the preferred radio access technology.

4. The system of claim 3, further comprising: a provisioning data component that receives information associated with the domain of the macro cell network based on data provided by a service provider during provisioning.

5. The system of claim 3, further comprising: a radio detection component that performs a macro cell radio signal scan to determine the domain of the macro cell.

6. The system of claim 1, wherein the communication is a first communication and the system further comprises: a communication history component that receives historical data associated with a radio access technology type employed by the user equipment during a second communication, wherein the preferred domain selection component employs the historical data to determine the preferred radio access technology.

7. The system of claim 1, further comprising: a preferred domain transmission component that conveys information associated with the preferred domain to the user equipment, prior to initiation of the communication.

8. The system of claim 1, wherein the user equipment performs a same-domain handover between the femtocell and the macro cell, during the communication.

9. The system of claim 1, wherein the preferred radio access technology includes a circuit switched radio access technology.

10. A method, comprising:
identifying a probability that a user equipment will perform a handover between a femtocell and a macro cell within a predefined period of time;
selecting a preferred domain, for a communication associated with the user equipment, that includes a radio access technology which is common to the femtocell and the macro cell; and
utilizing the preferred domain to initiate the communication prior to the handover and in response to the probability meeting a predetermined criterion.

11. The method of claim 10, wherein the selecting includes selecting the preferred domain based in part on a domain of the macro cell.

12. The method of claim 11, further comprising: determining the domain of the macro cell by performing a macro cell radio signal scan.

13. The method of claim 10, further comprising, transmitting information associated with the preferred domain to a femto access point associated with the femtocell.

14. The method of claim 10, wherein the probability is a first probability and the identifying includes:
determining that the user equipment is attached to the femtocell; and
determining a second probability that the user equipment will move outside a coverage area of the femtocell.

15. The method of claim 14, wherein the selecting includes:
selecting a domain of the macro cell as the preferred domain, in response to the second probability being greater than a threshold; and
selecting the preferred domain based in part on a service experience provided by the domain, in response to the second probability being less than the threshold.

16. The method of claim 10, wherein the probability is a first probability and the identifying includes:
determining that the user equipment is within the macro cells; and
determining a second probability that the user equipment will move into a coverage area of the femtocell.

17. The method of claim 16, wherein the selecting includes:
selecting a domain of the femtocell as the preferred domain, in response to the second probability being greater than a threshold; and
selecting the preferred domain based in part on a service experience provided by the domain, in response to the second probability being less than the threshold.

18. A non-transitory computer-readable storage medium having instructions stored thereon that, in response to execution, cause a system to perform operations, comprising:
determining a probability that a user equipment will perform a handover between a femtocell and a macro cell, within a predefined period of time;
identifying a preferred domain, for a communication associated with the user equipment, that includes a radio access technology which is common to the femtocell and the macro cell; and
prior to the handover and in response to the probability meeting a predetermined criterion, initiating the communication utilizing the preferred domain.

19. The non-transitory computer-readable storage medium of claim 18, wherein, the identifying includes selecting the preferred domain as a function of a geographical location of the femtocell.

20. The non-transitory computer-readable storage medium of claim 18, wherein the identifying includes determining the preferred domain based on data associated with the macro cell that is received from a service provider during provisioning.

* * * * *